Dec. 11, 1962 W. W. YARRISON 3,067,469
MANUFACTURE OF POROUS SHEET MATERIALS
Filed July 24, 1959
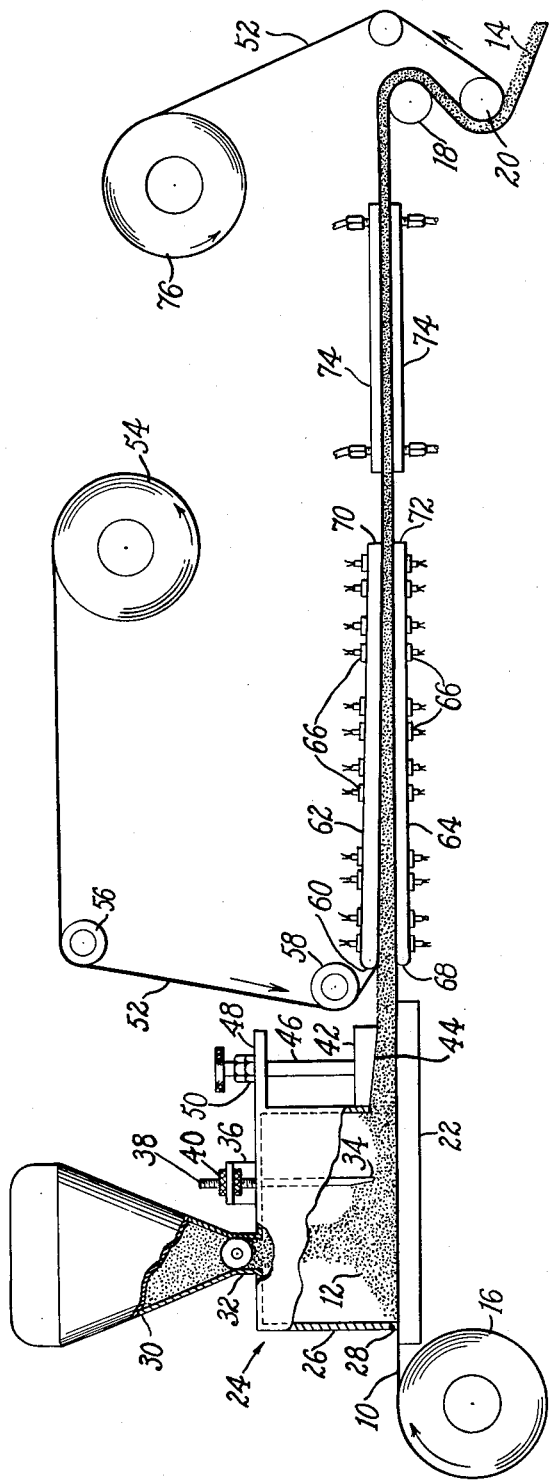
Inventor
Walter W. Yarrison
By his Attorney
Benjamin C. Pollard

United States Patent Office 3,067,469
Patented Dec. 11, 1962

3,067,469
MANUFACTURE OF POROUS SHEET MATERIALS
Walter W. Yarrison, Beverly, Mass., assignor, by mesne assignments, to Rogers Corporation, Killingly, Conn., a corporation of Massachusetts
Filed July 24, 1959, Ser. No. 829,443
6 Claims. (Cl. 18—55)

This invention relates to an improvement in the manufacture of composite sheet material including a microporous sintered plastic surface layer.

In the manufacture of laminates of microporous sintered plastic and fibrous backing sheets it was the earlier practice to form a sheet or preform by sintering plastic particles together and to combine the sheets or preforms with a backing sheet such as a resin or rubber reinforced felted fibrous sheet. Substantial economies may be effected by manufacturing microporous sintered plastic material in a continuous manner.

In procedures heretofore known for forming sintered plastic sheets, compression of the heated resin granules is effected by pressing the granules in heated condition with a metallic surface, in this instance a stainless steel belt. This method is effective to make uniform continuous lengths of sintered plastic resin sheet material; but for some purposes the surface porosity of the sheet material has not been entirely satisfactory. Resinous granules sintered into a sheet where pressure is exerted against heated granules by the hard unyielding surfaces of metal mold members or of a metal belt have a glazed appearance and undesirably reduced degree of porosity at the surface. Also, it has been necessary to subject sintered sheets, either preforms or fully molded sheets, to a subsequent lamination treatment involving the use of heat and limited pressure to form the laminated sheet material which has been found particularly useful for shoe insoles. This additional heating and pressing further reduced the moisture transmissive characteristics of the sintered plastic layer.

It is an object of the present invention to form a composite sheet including a felted fibrous sheet and a microporous resin layer in a simple continuous manner eliminating the separate stages of sintering the resin to sheet form and bonding the sintered resin sheet to the fibrous sheet.

It is a further object to form a microporous layer of sintered resin granules having improved surface porosity and character.

In accordance with the present invention, granules of a thermoplastic resin are deposited as a uniform layer on the surface of a resilient felted porous fibrous sheet and a second resiliently compressible, fibrous sheet is laid down on the resin particle layer. This assembly is then passed between heated plates defining a passageway of diminishing thickness, the plates being heated to a temperature which will supply heat through the fibrous sheets to raise the resin particles of the layer to sintering temperature within the time required for a given portion of the assembly to pass between the heated plates. The heated plates are spaced a distance apart at the entry corresponding substantially to the thickness of the assembly before heating and are spaced at the exit at a distance less than that at the entry to supply heat and pressure to sinter together the resin particles.

It appears that the reduction in rate of heat supplied to the particles of resin by reason of the insulating character of the fibrous sheets of the assembly prevents the sharp temperature differential which would exist between the temperature of resin particles in contact with a heated metal surface and the temperature of resin particles spaced from the metal surface. Thus the particles in the resin layer in the method of the present invention are more nearly uniform in temperature so that sintering pressure forms a strong uniformly sintered sheet. Also, because the surface granules are not overheated and because of the yielding nature of the fibrous sheet, the surface granules are not flattened out and hence there is preserved a greater degree of porosity at the surface of the sintered resin sheet.

The invention will be described further in connection with the attached drawing forming part of the disclosure of the present invention. In the drawing, the figure is a diagrammatic view in side elevation of one form of sheet forming apparatus useful in practicing the method of the present invention.

In the embodiment shown in the drawing, the resilient felted fibrous backing sheet 10 acts as the conveyor means to lead the thermoplastic resin granules 12 through the successive stations in which the particles are brought to a firm microporous layer 14 in which the granules are sintered together into a firm body. Fibrous sheets useful herein include porous resiliently compressible fiberboards, particularly rubber and/or resin impregnated fiberboards, woven fabrics, and non-woven fabrics. It is important that the fibrous sheets be of substantial strength and firmness and, where the sheets are to serve as permanent backing sheets in the final product, that they be capable of being bonded strongly to the microporous plastic sheet. It is further important that they be resistant to distortion under the temperature and pressure conditions encountered in sintering the plastic granules and bonding the fibrous sheets to the sintered sheet of plastic granules. Commercially available synthetic rubber impregnated fibrous sheet material of the kind used for inexpensive insoles, suitably from about .02 to about .06 inches in thickness has been found very satisfactory.

Preferably, there is provided on the surface of the fibrous sheet, a bonding agent which may comprise a deposit of resinous material which will permit passage of water vapor and/or air between the microporous sheet and the fibrous sheet. Thus the bonding agent either should be in the form of a thin discontinuous film or layer on the fibrous sheet or should be of a chemical nature to permit transmission of water vapor through it. Discontinuous films or layers of bonding agent may be formed by depositing the bonding agent in discontinuous form, e.g. in strips, dots, or as individual particles. A preferred procedure for depositing the bonding layer is to spray a surface of the fibrous sheet with an aqueous dispersion, suitably a resin latex, of the bonding agent and thereafter to evaporate the water leaving a discontinuous deposit of bonding agent at the surface of the fibrous sheet. A 40% solids plasticizer vinyl chloride aqueous emulsion polymer latex has been found very satisfactory for this use, but other dispersions of thermoplastic resins compatible with the resin particles may be used. A deposit of from about ⅛ of an ounce to about one ounce of resin per squre foot of a fiber sheet surface has been found satisfactory. Bonding agents having permeability to water vapor include the water vapor transmissive polyamide resins and the various polyelectrolyte resins, e.g. polyacrylate-acrylic acid and the like. The bonding agents useful herein may be thermoactive or pressure sensitive, and in the case of a bonding agent deposited in discontinuous form may comprise either a water vapor permeable material or any of the known resin and/or rubber materials which are adhesive under the conditions encountered in the sintering and bonding operation. Thus suitable bonding agents of this type include natural rubber compounds, synthetic resins such as polystyrene, polyvinyl chloride, and copolymers of vinyl chloride, for example with vinyl acetate. Selection of a bonding agent for use in any particular system is within the skill of persons versed in the art.

A backing sheet 10 of suitable felted fibrous nature is drawn from the roll 16 and is pulled through successive stations by the driven reverse bend rolls 18 and 20 at the end of the sintering and bonding steps. From the roll 16 the sheet first passes over a rigid table 22 beneath a plastic granule spreading and initial compaction device 24. The device shown comprises an open bottomed box 26 of which the lower edges of the sides are joined to the table and the lower edge 28 of the entering end of the box is spaced from the table 22 to provide clearance for passage of the backing sheet 10. A hopper 30 containing the plastic granules is mounted at the top of the box 26 and is fitted at its lower end with a feeder 32 which passes plastic granules at a controllable rate into the box 26 and onto the moving backing sheet 10 in the box 26. The granules on the backing sheet are carried forward by the sheet and are spread in an even layer at a desired thickness by the blade 34 which is supported by the bracket 36 and is adjustable vertically by the threaded rod 38 and knurled nut 40. The blade 34 is adjusted to control the thickness of the layer of granules carried past it and the feeder 32 is operated to maintain a small accumulation of granules before the plate 34 to insure that the backing sheet 10 is uniformly covered with granules to the desired depth. The thickness of the layer of the granules passing the blade 34 is controlled to insure maintenance of a small accumulation of plastic granules at the exit end of the box 26 before the initial compaction.

Thermoplastic resins suitable for use in the process of the present invention include vinyl resins, polyethylene, natural rubber and/or the various synthetic rubbers, the various acrylic resins and other water insoluble thermoplastic resins both natural and synthetic which either are flexible by nature or which can be flexibilized with suitable agents. These materials may be blended with each other and/or compounded with fillers, plasticizers, pigments or dyes, and the like according to well-known compounding techniques to provide suitable resilient compositions. Several of the materials, e.g. the vinyl chloride polymers, are obtainable in the form of fine particles suitable for sintering. A resin compound available in granular form and suitable for the production of a microporous sintered sheet material comprises 66.53 parts by weight of a copolymer of vinyl chloride and vinyl acetate in the ratio of 95:5, 32.25 parts by weight of a nonvolatile plasticizer, 0.64 part by weight of a coloring agent and filler, 0.22 part by weight of a commercial wetting agent (e.g. "Tween 20") and 0.36 part by weight of bisphenol epichlorhydrine condensate. The condensate acts as a heat stabilizer for the copolymer and the wetting agent is believed to aid movement of moisture through the microporous sintered sheet. Where the resins are not available in this form it is possible to subdivide masses of them to provide the desired particles. Product requirements dictate the size of particles to be sintered together. Using the plasticized granular resin compound described above, particles which are of a size to pass through a 30 mesh screen are preferred.

The layer of resin granules is carried by the backing sheet 10 beneath the uniforming and initial compaction member 42 extending across the exit end of the box. This uniforming and compaction member is a rigid metal member having a smooth lower face 44 extending at a slight angle, which may be of the order of 10°, to the backing sheet 10 to define with the backing sheet a path of diminishing cross section. The lower face 44 may be, for example, 2" wide so that the edge adjacent the box is 0.442" further from the backing sheet than is the opposite edge. Depending on the spacing of the face 44 from the backing sheet, the thickness of the layer of granules may be from 3 to 8 times as great at the edge adjacent the box 26 as at the opposite end. The reduction in thickness is due largely to reduction in the amount of resin carried past the member; but the layer of granules is somewhat compacted and any voids in the layer are filled in in passing beneath the compaction member 42. The uniforming and initial compaction member 42 is carried by the rod 46 which is adjustable heightwise in the bracket 48 by means of adjusting nuts 50. The uniforming and initial compaction member 42 is adjusted to spread the granules in a layer containing from about 0.05 to about 0.40 pound of resin per square foot of backing sheet, preferably from 0.06 to 0.20 pound per square foot.

A cover sheet 52, which suitably is of the same material as the backing sheet 10 but preferably without bonding agent on its surface, is drawn from the roll 54, passes around the rollers 56 and 58 and is brought down against the upper surface of the layer of resin granules by the rounded leading edge 60 of the plate 62. The assembly of cover sheet 10, plastic granules and backing sheet 52 passes between the plates 62 and 64 which are heated to from about 300° to about 400° F. by the electrical heating units 66 to supply the heat required to sinter the plastic granules. The plate 62 is spaced from the lower plate 64 at their leading ends 60 and 68 an amount greater than the spacing of the plates at the trailing ends 70 and 72 to reduce the thickness of the layer of plastic granules to provide a ratio of initial thickness to final thickness in the range of from about 4:1 to about 2:1. The greater the percentage compaction, the greater the increase in density and the lower the porosity.

Heat from the heated plates 62 and 64 must pass through the cover and backing sheets 52 and 10 before raising the temperature of the plastic granules to sinter them under the applied pressure into a microporous layer. Because the rate of heat transmission through the fibrous cover and backing sheets is comparable to the rate of heat transfer in the granule layer, there is no localized overheating of the granules at the boundary between the backing and cover sheets and the surfaces of the granule layer. Likewise, the cover and backing sheets 52 and 10 are somewhat compressible, as contrasted to metal surfaces. These factors cooperate to prevent excessive flattening and spreading of the granules on the surfaces of the layer of plastic granules so that the porosity of the surfaces of the plastic is preserved.

The length of the heated plates 62 and 64 used will depend on the rate of movement of the assembly, the temperature of the plates, the thickness of the resin layer, the thickness of the backing sheet 10 and cover sheet 52 and the sintering temperature of the resin. Using particles of a copolymer of vinyl chloride and vinyl acetate in a layer initially 0.085" in thickness and finally 0.030" in thickness, with fibrous cover and backing sheets .05" in thickness and plates heated to about 350° F., excellent results have been obtained with plates 8' in length where the assembly moved between the plates at a rate of about 8.5' per minute and with plates 4' long where the assembly moved between the plates at 4' per minute.

Where, as in the preferred form of the invention the backing sheet carries a bonding agent at its surface, the heating of the assembly between the heating plates unites the sintered microporous layer 14 of plastic to the backing sheet 10 in a strong bond. It has been found that superior bonding coupled with desired retention of porosity in the microporous layer 14 are obtained where the temperature of the lower plate 64, i.e. the plate adjacent the fibrous sheet 10 carrying a bonding agent, is kept somewhat higher, for example about 15° to about 30° F., than that of the upper plate 62. For example, the lower plate 64 may be heated to a temperature of about 360° F. and the upper plate to about 340° F. With the plates heated to these temperatures, the surface of the lower fibrous sheet adjacent the resin will reach 250° to 275° F. and the surface of the upper fibrous sheet adjacent the resin will be about 10° F. lower.

The assembly of backing sheet 10, microporous sintered plastic layer 14 and cover sheet 52 is then cooled. This is best accomplished between cold plates 74 spaced apart a distance corresponding to the thickness of the assembly. In the apparatus shown, these plates may be, for example, 4' long and maintained at a temperature of about 50 to 65° F. by cooling water passed therethrough.

From the cooling plates 74, the assembly passes around the reverse bend driving rolls 18 and 20 which pull the assembly through the various stations. After passing the second driving roll 20, the cover sheet 52 is pulled away from the microporous plastic layer 14 and is wound up on a roll 76. The backing sheet 10 and microporous resin layer 14 are found to be firmly bonded together and are passed to storage.

Where, as in the preferred case, the cover sheet 52 is of the same material as the backing sheet 10, the used cover sheet 52 may be provided at one surface with a deposit of bonding agent and used thereafter as a backing sheet 10 in making further products.

Having thus described my invention what I claim as new and desire to secure by Letters Patent of the United States is:

1. The method of manufacturing a microporous sheet of resin which comprises the steps of spreading fine granular, thermoplastic resin in a uniform layer on a resiliently compressible fibrous sheet, laying down on the exposed surface of said layer a resiliently compressible, fibrous sheet, passing the resultant assembly between heated plates defining a passageway in thickness from a thickness at the entry to the passageway approximating the initial thickness of said assembly to a thickness less than said initial thickness at the exit of said passageway, said heated plates supplying heat and pressure to portions of said assembly passing therethrough to sinter the resin granules together into a microporous layer.

2. The method of manufacturing a microporous layer of ester plasticized vinyl chloride-vinyl acetate copolymer resin affording through passage of air from one face to the other, which comprises the steps of distributing on the face of a resiliently compressible fibrous sheet fine granules of vinyl chloride polymer resin to form a uniform layer, laying down on the exposed surface of said layer a resiliently compressible, fibrous sheet, passing the resultant assembly between heated plates defining a passageway diminishing in thickness from a thickness at the entry to the passageway approximating the initial thickness of said assembly to a thickness less than said initial thickness at the exit of said passageway, said heated plates supplying heat and pressure to said assembly to sinter the resin particles together into a microporous layer, cooling said assembly and stripping a fibrous sheet from said microporous layer.

3. The method of manufacturing a composite sheet including a resiliently compressible felted fibrous sheet and a microporous layer of ester plasticized vinyl chloride-vinyl acetate copolymer resin in which said composite sheet affords through passage of air from one face to the other, which comprises the steps of providing at a surface of said fibrous sheet a deposit of resinous material which will permit passage of water vapor, distributing on said surface of the fibrous sheet fine granules of ester plasticized vinyl chloride-vinyl acetate copolymer resin, moving said fibrous sheet and resin particles thereon through a path of diminishing cross section to lightly compact said granules and form them into a uniform layer, laying down on the exposed surface of said layer a resiliently compressible, fibrous sheet, passing the resultant assembly between heated plates defining a passageway diminishing in thickness from a thickness at the entry to the passageway approximating the initial thickness of said assembly to a thickness less than said initial thickness at the exit of said passageway, said heated plates being at a temperature of from about 300° to about 400° F. and supplying heat and pressure to said assembly to sinter the resin granules together into a microporous layer and to bond said layer to the surface of the first-mentioned fibrous sheet carrying the deposit of resinous material, cooling said assembly and stripping the second-mentioned fibrous sheet from said microporous layer.

4. The method of manufacturing a composite sheet including a resiliently compressible felted fibrous sheet and a microporous layer of ester plasticized vinyl chloride-vinyl acetate copolymer resin in which said composite vinyl acetate copolymer resin in which said composite sheet affords through passage of air from one face to the other, which comprises the steps of spraying a surface of said fibrous sheet with an aqueous emulsion polymer latex of polyvinyl chloride resin and evaporating the water content of the applied latex to form at the surface of said fibrous sheet a discontinuous adherent deposit of polyvinyl chloride resin, distributing on the spray-treated surface of the fibrous sheet fine granules of ester plasticized vinyl chloride-vinyl acetate copolymer resin, moving said fibrous sheet and resin granules thereon through a path of diminishing cross section to lightly compact said granules and form them into a uniform layer, laying down on the exposed surface of said layer a resiliently compressible, fibrous sheet, passing the resultant assembly between heated plates defining a passageway diminishing in thickness from a thickness at the entry to the passageway approximating the initial thickness of said assembly to a thickness less than said initial thickness at the exit of said passageway, the diminution in thickness compressing said layer of granules to provide a ratio of original thickness to ultimate thickness in the range of about 4:1 to 2:1, said heated plates being at a temperature of from about 300° to about 400° F. and supplying heat and pressure to said assembly to sinter the resin granules together into a microporous layer and to bond said layer to the treated face of said first-mentioned fibrous sheet, cooling said assembly, and stripping the untreated fibrous sheet from said microporous layer.

5. The method of manufacturing a composite sheet including a resiliently compresssible felted, porous, fibrous sheet from about .02 to about .06 inch in thickness and a microporous layer of ester plasticized vinyl chloride-vinyl acetate copolymer resin in which said composite sheet affords through passage of air from one face to the other, which comprises the steps of spraying a surface of said fibrous sheet with an aqueous emulsion polymer latex of polyvinyl chloride resin and evaporating the water content of the applied latex to form at the surface of said fibrous sheet a discontinuous adherent deposit of from about ⅛ of an ounce to about one ounce of polyvinyl chloride resin per square foot of fibrous sheet, distributing on the spray-treated surface of the fibrous sheet fine granules capable of passing a 30 mesh screen of ester plasticized vinyl chloride-vinyl acetate copolymer resin, moving said fibrous sheet and resin granules thereon through a path of diminishing cross section defined by surface of which one is inclined to the other at an angle of about 10° to lightly compact said granules and form them into a uniform layer containing from about 0.06 to 0.2 pound of resin per square foot of said fibrous sheet, laying down on the exposed surface of said layer a resiliently compressible, fibrous sheet from about .02 to about .06 inch in thickness, passing the resultant assembly between heated plates defining a passageway of diminishing thickness, the difference between the initial thickness and the final thickness of said passageway being from about 50% to about 75% of the initial thickness of said uniform layer, said plates being at a temperature of from about 300° to about 400° F. and supplying heat and pressure to said assembly to sinter the resin granules together into a microporous layer and to bond said layer to the treated face of said first-mentioned fibrous sheet, cooling said assembly and stripping the untreated fibrous sheet from said microporous layer.

6. The method of manufacturing a microporous sheet of vinyl chloride-vinyl acetate resin which comprises the steps of spreading fine granules of vinyl chloride-vinyl acetate thermoplastic resin in a uniform layer on a resiliently compressible sheet, laying down on the exposed surface of said layer a resiliently compressible sheet, and passing the resultant assembly between heated plates defining a passageway diminishing in thickness from a thickness at the entry to the passageway approximately the initial thickness of said assembly to a thickness less than said initial thickness at the exit of said passageway, said heated plates supplying heat and pressure to portions of said assembly passing therethrough to sinter the resin granules together into a microprous layer.

References Cited in the file of this patent

UNITED STATES PATENTS

| | | |
|---|---|---|
| 2,299,066 | Berger | Oct. 20, 1942 |
| 2,446,644 | Fischer | Aug. 10, 1948 |
| 2,451,597 | Wheeler | Oct. 19, 1948 |
| 2,543,101 | Francis | Feb. 27, 1951 |
| 2,600,164 | Heywood | June 10, 1952 |
| 2,697,254 | Gordon | Dec. 21, 1954 |
| 2,704,735 | Hedges et al. | Mar. 22, 1955 |
| 2,707,018 | Bolton | Apr. 26, 1955 |
| 2,732,324 | Morris | Jan. 24, 1956 |
| 2,813,052 | Lancaster | Nov. 12, 1957 |

FOREIGN PATENTS

| | | |
|---|---|---|
| 333,161 | Great Britain | Aug. 5, 1930 |